(12) United States Patent
Deng et al.

(10) Patent No.: US 10,019,220 B2
(45) Date of Patent: Jul. 10, 2018

(54) CONTROL METHOD AND APPARATUS THEREOF

(71) Applicants: Beijing Lenovo Software Ltd., Beijing (CN); Lenovo (Beijing) Co., Ltd., Beijing (CN)

(72) Inventors: Rui Deng, Beijing (CN); Xiaohai Zhang, Beijing (CN)

(73) Assignees: Beijing Lenovo Software Ltd., Beijing (CN); Lenovo (Beijing) Co., Ltd., Beijing (CN)

( * ) Notice: Subject to any disclaimer, the term of this patent is extended or adjusted under 35 U.S.C. 154(b) by 0 days.

(21) Appl. No.: 14/928,601

(22) Filed: Oct. 30, 2015

(65) Prior Publication Data

US 2017/0010849 A1 Jan. 12, 2017

(30) Foreign Application Priority Data

Jul. 6, 2015 (CN) .......................... 2015 1 0391170

(51) Int. Cl.
*G06F 3/14* (2006.01)
*G09G 5/10* (2006.01)
*G06F 3/041* (2006.01)

(52) U.S. Cl.
CPC .......... *G06F 3/1454* (2013.01); *G06F 3/0416* (2013.01); *G06F 3/1423* (2013.01);
(Continued)

(58) Field of Classification Search
None
See application file for complete search history.

(56) References Cited

U.S. PATENT DOCUMENTS 5,043,919 A * 8/1991 Callaway .............. G06F 3/1415
715/733
9,372,545 B2 6/2016 Song et al.
(Continued)

FOREIGN PATENT DOCUMENTS

CN 103124949 A 5/2013
CN 104281255 A 1/2015
(Continued)

OTHER PUBLICATIONS

First Chinese Office Action regarding Application No. 201510391170.1 dated Jul. 4, 2017. English translation provided by http://globaldossier.uspto.gov.

*Primary Examiner* — Christopher Kohlman
(74) *Attorney, Agent, or Firm* — Harness, Dickey & Pierce, P.L.C.

(57) ABSTRACT

A control method and an apparatus thereof applied to a terminal apparatus with a display device are provided. The terminal apparatus can establish a data connection with a wearable device. The method includes: receiving a control instruction generated by the terminal apparatus; acquiring a display picture on the display device of the terminal apparatus based on the control instruction; and sending the display picture to the wearable device through data connection, so that the wearable device displays the display picture. After the control instruction is generated by the terminal apparatus, the display picture on the display device of the terminal apparatus is sent to the wearable device through the data connection, to display the display picture on the wearable device. Thus, viewing experience different from viewing through the terminal apparatus is provided for a user and the viewing experience for the user is improved.

7 Claims, 11 Drawing Sheets

(52) U.S. Cl.
CPC ....... *G09G 5/10* (2013.01); *G09G 2320/0626* (2013.01); *G09G 2356/00* (2013.01); *G09G 2358/00* (2013.01); *G09G 2370/16* (2013.01)

(56) References Cited

U.S. PATENT DOCUMENTS

| | | | |
|---|---|---|---|
| 2009/0276439 A1* | 11/2009 | Rosenblatt | G06F 17/30058 |
| 2014/0019786 A1* | 1/2014 | Green | H04W 52/0258 |
| | | | 713/320 |
| 2015/0009096 A1 | 1/2015 | Lee et al. | |
| 2015/0082058 A1* | 3/2015 | Hahm | G06F 3/1454 |
| | | | 713/320 |
| 2015/0084855 A1 | 3/2015 | Song et al. | |
| 2016/0110012 A1* | 4/2016 | Yim | G06F 1/1626 |
| | | | 345/173 |
| 2016/0240154 A1* | 8/2016 | Forutanpour | G06F 3/0412 |

FOREIGN PATENT DOCUMENTS

| | | |
|---|---|---|
| CN | 204408541 U | 6/2015 |
| EP | 2866122 A1 | 4/2015 |

\* cited by examiner

CONTROL METHOD AND APPARATUS THEREOF

CROSS-REFERENCE TO RELATED APPLICATIONS

This application claims priority to Chinese Patent Application No. 201510391170.1 titled "CONTROL METHOD AND APPARATUS THEREOF", filed with the Chinese Patent Office on Jul. 6, 2015, which is hereby incorporated by reference in its entirety.

TECHNICAL FIELD

The disclosure relates to the field of electronic technology, and particularly to a control method and an apparatus thereof.

BACKGROUND

With the development of electronic technology, a terminal apparatus such as a cell phone plays a more and more important role in everyday life.

When using a cell phone, a user can view the display content only through the cell phone. Thus in conventional technology, the cell phone terminal cannot provide the user with much viewing experience.

SUMMARY

In view of this, a control method and an apparatus thereof are provided according to the disclosure, to solve the technical problem that in conventional technology the display content of a cell phone is prone to be seen by others, due to which user security is affected.

To achieve the above object, technical solutions are provided according to the disclosure.

A control method applied to a terminal apparatus with a display device is provided, where the terminal apparatus can establish a data connection with a wearable device. The method includes:

receiving a control instruction generated by the terminal apparatus;

acquiring a display picture on the display device of the terminal apparatus based on the control instruction; and sending the display picture to the wearable device through the data connection, so that the wearable device displays the display picture.

Preferably, in the method mentioned above, after receiving the control instruction generated by the terminal apparatus, the method further includes:

controlling the terminal apparatus not to display the display picture on the display device based on the control instruction; or controlling display brightness of the display device of the terminal apparatus to reduce to a preset threshold based on the control instruction.

Preferably, in the method mentioned above, acquiring the display picture on the display device of the terminal apparatus based on the control instruction includes:

determining an operation area of a user on the terminal apparatus based on the control instruction; and acquiring a display picture on the display device of the terminal apparatus corresponding to the operation area.

Preferably, in the method mentioned above, acquiring the display picture on the display device of the terminal apparatus based on the control instruction includes:

determining, based on the control instruction, a display area where display content on the display device of the terminal apparatus changes; and acquiring the display picture in the display area.

Preferably, in the method mentioned above, the terminal apparatus includes a touch sensor.

Accordingly, after controlling the terminal apparatus not to display the display picture on the display device based on the control instruction, or after controlling the display brightness of the display device of the terminal apparatus to reduce to the preset threshold based on the control instruction, the method further includes:

receiving, through the touch sensor, a first operation performed on the terminal apparatus by a user operation body; and executing a touch instruction corresponding to the first operation.

Preferably, in the method mentioned above, after executing a touch instruction corresponding to the first operation, the method further includes:

Acquiring, display content on the display device of the terminal apparatus corresponding to the touch instruction; and sending the display content to the wearable device through the data connection, so that the wearable device displays the display content.

Preferably, in the method mentioned above, receiving the control instruction generated by the terminal apparatus includes:

generating a prompt signal once it is detected that a data connection is established between the terminal apparatus and the wearable device, where the prompt signal is used to prompt transfer of display picture;

receiving a second operation performed on the terminal apparatus by a user operation body;

generating a control instruction based on the second operation; and receiving the control instruction.

Another control method applied to a wearable device is further provided according to the disclosure, where the wearable device can establish a data connection with a terminal apparatus with a display device. The method includes:

receiving a display picture sent by the terminal apparatus through the data connection, where the display picture is a display picture acquired from the display device by the terminal apparatus based on a control instruction generated by the terminal apparatus; and displaying the display picture.

A control apparatus applied to a terminal apparatus with a display device is further provided according to the disclosure, where the terminal apparatus can establish a data connection with a wearable device. The apparatus includes:

an instruction receiving unit, configured to receive a control instruction generated by the terminal apparatus;

a picture acquiring unit, configured to acquire a display picture on the display device of the terminal apparatus based on the control instruction; and a picture sending unit, configured to send the display picture to the wearable device through the data connection, so that the wearable device displays the display picture.

Preferably, the apparatus mentioned above further includes:

a first control unit, configured to control the terminal apparatus not to display the display picture on the display device based on the control instruction after the instruction receiving unit receives the control instruction; and a second control unit, configured to control a display brightness of the display device of the terminal apparatus to be reduced to a preset threshold based on the control instruction after the instruction receiving unit receives the control instruction.

Preferably, in the apparatus mentioned above, the picture acquiring unit includes:

an operation area determining subunit, configured to determine an operation area of a user on the terminal apparatus based on the control instruction; and a first picture acquiring subunit, configured to acquire a display picture on the display device of the terminal apparatus corresponding to the operation area.

Preferably, in the apparatus mentioned above, the picture acquiring unit includes:

a change area determining subunit, configured to determine, based on the control instruction, a display area where display content on the display device of the terminal apparatus changes; and a second picture acquiring subunit, configured to acquire a display picture in the display area.

Preferably, in the apparatus mentioned above, the terminal apparatus includes a touch sensor.

Accordingly, the apparatus further includes:

an operation receiving unit, configured to receive, through the touch sensor, a first operation performed on the terminal apparatus by a user operation body, after the first control unit controls the terminal apparatus not to display the display picture on the display device, or after the second control unit controls display brightness of the display device of the terminal apparatus to reduce to a preset threshold; and an instruction executing unit, configured to execute a touch instruction corresponding to the first operation.

Preferably, the apparatus mentioned above further includes:

a content acquiring unit, configured to acquire a display content on the display device of the terminal apparatus corresponding to the touch instruction after the instruction executing unit executes the touch instruction; and a content displaying unit, configured to send the display content to the wearable device through the data connection, so that the wearable device displays the display content.

Preferably, in the apparatus mentioned above, the instruction receiving unit includes:

a signal generating subunit, configured to generate a prompt signal once it is detected that a data connection is established between the terminal apparatus and the wearable device, where the prompt signal is used to prompt transfer of display picture;

an operation receiving subunit, configured to receive a second operation performed on the terminal apparatus by a user operation body;

an instruction generating subunit, configured to generate a control instruction based on the second operation; and an instruction receiving subunit, configured to receive the control instruction.

Another control apparatus applied to a wearable device is further provided according to the disclosure, where the wearable device establishes a data connection with a terminal apparatus with a display device. The apparatus includes:

a picture receiving unit, configured to receive a display picture sent by the terminal apparatus through the data connection, where the display picture is a display picture acquired from the display device by the terminal apparatus based on a control instruction generated by the terminal apparatus; and a picture displaying unit, configured to display the display picture.

As can be seen from the technical solutions mentioned above, compared with conventional technology, in the control method and the apparatus thereof according to the disclosure, after the control instruction is generated in the terminal apparatus, the display picture on the display device of the terminal apparatus is sent to the wearable device through the data connection, to display the display picture on the wearable device. Thus, viewing experience different from viewing through the terminal apparatus is provided for a user and the viewing experience for the user is improved.

BRIEF DESCRIPTION OF THE DRAWINGS

In order to illustrate the technical solutions according to the embodiments of the disclosure or in the conventional technology more clearly, the drawings to be used in the description of the embodiments or the conventional technology are described briefly hereinafter. Apparently, other drawings may be obtained by those skilled in the art according to those drawings without creative effort.

DETAILED DESCRIPTION OF THE EMBODIMENTS

Technical solutions according to embodiments of the disclosure are described clearly and completely hereinafter in conjunction with the drawings. Apparently, the described embodiments are only a part of rather than all of the embodiments of the disclosure. Any other embodiment obtained by those skilled in the art based on the embodiments of the disclosure without any creative work will fall in the protection scope of the disclosure.

Figure 1:
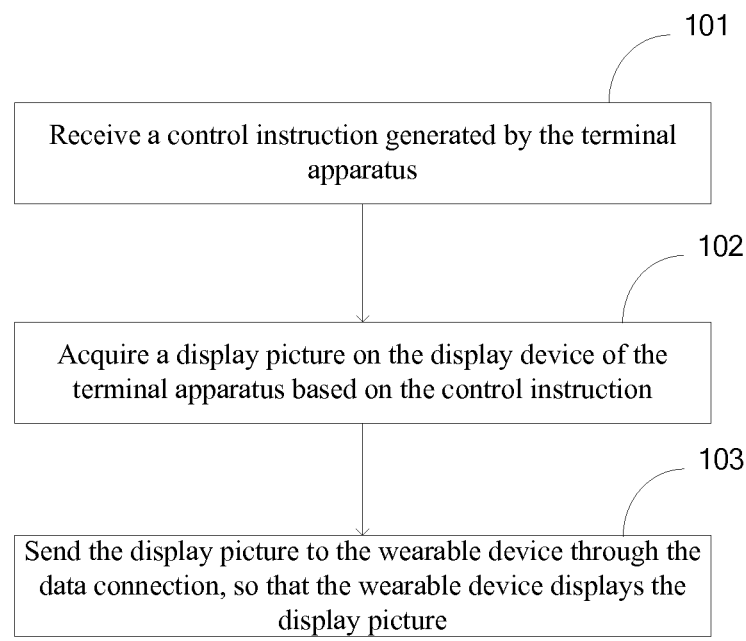
FIG. 1 is a flowchart of a control method according to a first embodiment of the disclosure.

Referring to FIG. 1, a flowchart of a control method according to a first embodiment of the disclosure is shown. The embodiment can be applied to a terminal apparatus with a display device, such as a device with a display screen, like a cell phone, a pad, an all-in-one machine and a laptop computer. The terminal apparatus can establish a data connection with a wearable device, and the wearable device may be a wearable device such as smart glasses or smart watch. The data connection between the terminal apparatus and the wearable device may be established via a wireless communication module such as a WiFi or Bluetooth wireless communication module.

In the embodiment, the method may include steps 101-103.

Step 101 may include receiving a control instruction generated by the terminal apparatus.

The control instruction is an instruction generated by the terminal apparatus when a user needs to change current viewing experience. The control instruction is received and responded in the embodiment.

Step 102 may include acquiring a display picture on the display device of the terminal apparatus based on the control instruction.

The display picture may be a picture in a partial or whole content display area of the display device.

In the embodiment, the received control instruction is responded, i.e., the picture in the partial or whole content display area of the display device of the terminal apparatus is acquired.

Step 103 may include sending the display picture to the wearable device through the data connection, so that the wearable device displays the display picture.

Figure 2:
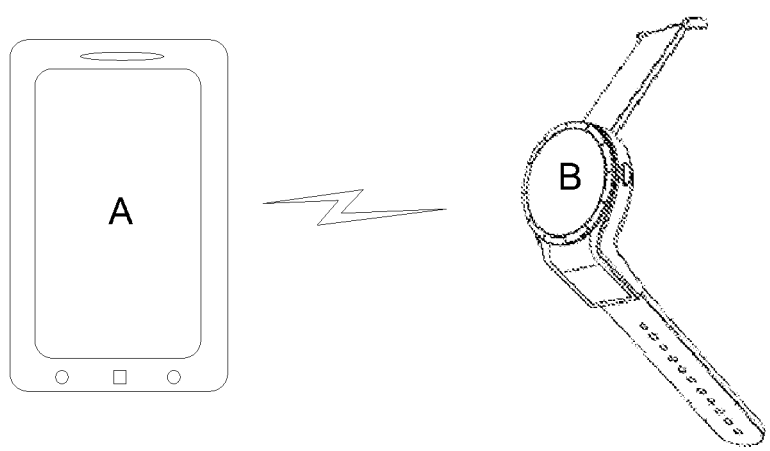
FIG. 2 is a diagram of an application example of the disclosure.

As show in FIG. 2, the data connection is established between a terminal apparatus A and the wearable device such as a watch B. In the embodiment, after the display picture on the terminal apparatus is acquired, the display picture is sent to the wearable device through the data connection, so that the wearable device displays the display picture, which enhances viewing experience for a user when the user views the display picture.

Specifically, the wearable device displays the received display picture on its display device. For example, the display picture is displayed on a display screen of a dial of the smart watch, and the display picture may be also displayed on a specific display screen of the wearable device such as a tiny head-mounted display screen equipped on lenses of smart glasses. In the embodiment, the wearable device projects the display picture on a small screen of a lens display over the user glasses, and the display effect is the same as a 25-inch high-resolution screen 2.4 meters away.

As can be seen from the technical solution mentioned above, in the control method according to the first embodiment of the disclosure, after the terminal apparatus generates the control instruction, the display picture on the display device of the terminal apparatus is sent to the wearable device through the data connection, to display the display picture on the wearable device, thus viewing experience different from viewing through the terminal apparatus is provided for the user and the viewing experience for the user is improved.

Figure 3:
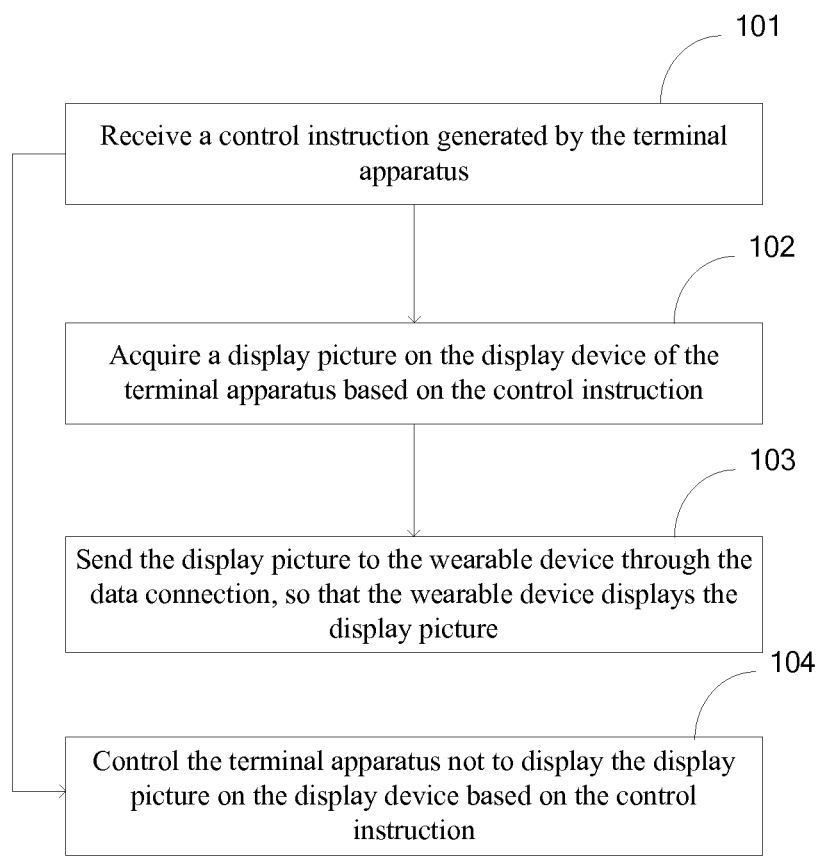
FIG. 3 is a flowchart of a control method according to a second embodiment of the disclosure.

Based on the foregoing solution, in order to improve security of content displayed on the terminal apparatus, for example, the display content on the display device visible to other people when a user uses the terminal apparatus in a public place such as a bus or a subway, a flowchart of a control method according to a second embodiment of the disclosure is shown in FIG. 3. After the step 101, the method may further include step 104.

Step 104 may include controlling the terminal apparatus not to display the display picture on the display device based on the control instruction.

In other words, in the embodiment, after the control instruction is received, the terminal apparatus is controlled not to display the display picture based on the control instruction when the display picture acquired from the terminal apparatus is sent to the wearable device for display based on the control instruction, for example, the screen of the terminal apparatus is blacked out or the display device of the terminal apparatus is turned off, so that other people cannot see or cannot see clearly the display content on the display device when the user uses the terminal apparatus, thus the security of the display content on the display device of the terminal apparatus is improved.

Figure 4:
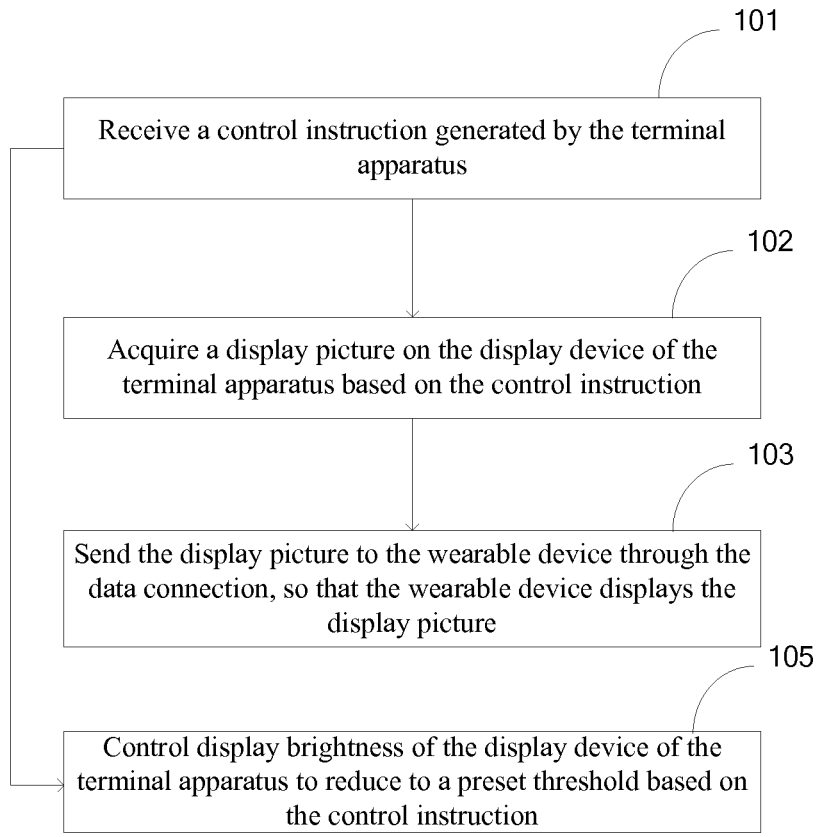
FIG. 4 is another flowchart according to the second embodiment of the disclosure.

In addition, to achieve the objective mentioned above, another flowchart according to the second embodiment of the disclosure is shown in FIG. 4. After step 101, the method may further include step 105.

Step 105 may include controlling brightness of the display device of the terminal apparatus to reduce to a preset threshold based on the control instruction.

The threshold may be a value preset by a user based on requirements such as a scenario the user is in. In other words, in the embodiment, after the control instruction is received, the brightness of the display device of the terminal apparatus is controlled to reduce to the preset threshold based on the control instruction when the display picture acquired from the terminal apparatus is sent to the wearable device for display based on the control instruction, for example, the brightness of the display device is reduced to 35% or 0%, so that other people cannot see or cannot see clearly the display content on the display device when the user uses the terminal apparatus, thus the security of the display content on the display device of the terminal apparatus is improved.

Figure 5:
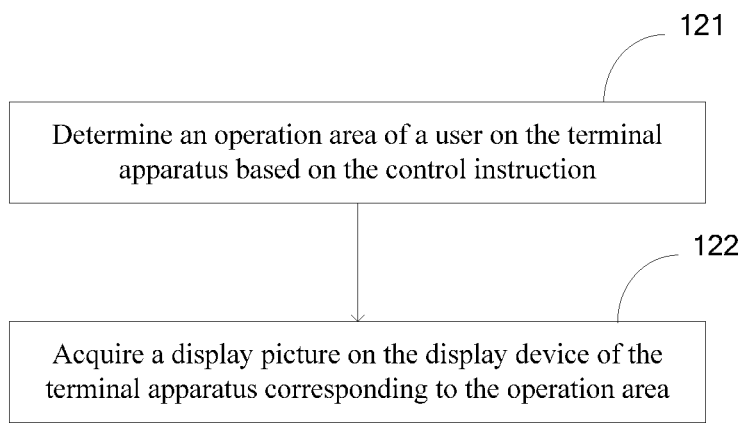
FIG. 5 is a partial flowchart of a control method according to a third embodiment of the disclosure.

Referring to FIG. 5, a flowchart of the step 102 in a control method according to a third embodiment of the disclosure is shown. The step 102 may include steps 121-122.

Step 121 may include determining based on the control instruction an operation area of a user on the terminal apparatus.

The operation area may be a partial or whole display area on the display device of the terminal apparatus.

Step 122 may include acquiring a display picture on the display device of the terminal apparatus corresponding to the operation area.

The operation area may be an operation area corresponding to an operation the user performs on the terminal apparatus after the terminal apparatus generates the control instruction. In the embodiment, the operation area is determined after the terminal apparatus generates the control instruction, to acquire a display picture corresponding to the operation area, which may be a picture in the partial or whole display area on the display device. Or, the operation area may be an operation area corresponding to an operation the user performs on the terminal apparatus when or after the terminal apparatus generates the control instruction. In the embodiment, the operation area is determined and a display picture corresponding to the operation area is acquired afterwards, which may be a picture in the partial or whole display area on the display device.

Figure 6:
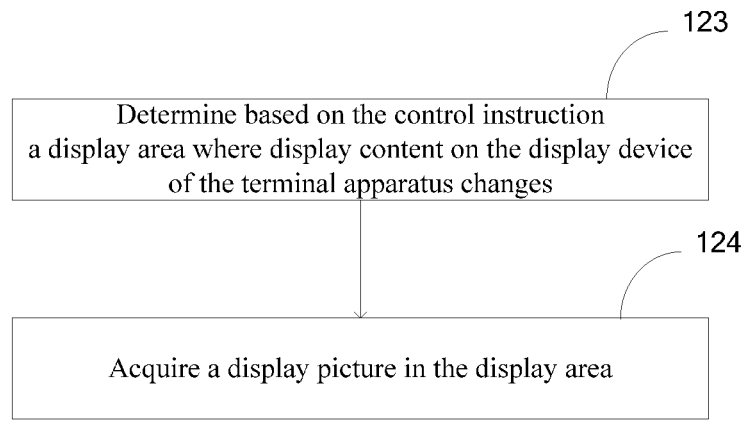
FIG. 6 is a partial flowchart of a control method according to a fourth embodiment of the disclosure.

In another specific implementation, referring to FIG. 6, a flowchart of the step 102 in a control method according to a fourth embodiment of the disclosure is shown. The step 102 may include steps 123-124.

Step 123 may include determining, based on the control instruction, a display area where display content on the display device of the terminal apparatus changes.

Step 124 may include acquiring a display picture in the display area.

In other words, in the embodiment, after the control instruction is received, the control instruction is responded, i.e., a display picture corresponding to a display area where the display content on the display device of the terminal apparatus changes is acquired. In subsequent operations, the display picture of which the display content changes is sent to the wearable device through the data connection, i.e., only the display picture corresponding to the display area where the display content on the display device of the terminal apparatus changes is displayed on the wearable device, to reduce data transmission amount, speed up picture updating efficiency and improve viewing experience for a user.

Figure 7:
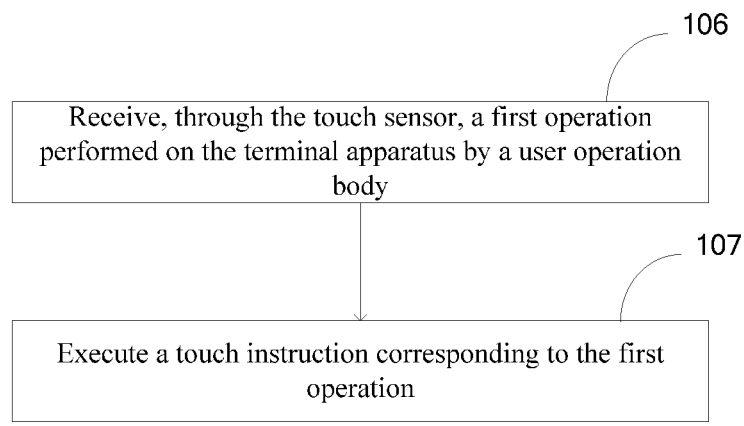
FIG. 7 is a partial flowchart of a control method according to a fifth embodiment of the disclosure.

In practical implementations, the terminal apparatus such as cell phone usually includes a touch sensor, which can detect a touch operation performed on the terminal apparatus by a user operation body. Thus, referring to FIG. 7, a partial flowchart of a control method according to a fifth embodiment of the disclosure is shown. After the step 104 or the step 105, the method may further include steps 106-107.

Step 106 may include receiving, through the touch sensor, a first operation performed on the terminal apparatus by the user operation body.

Step 107 may include executing a touch instruction corresponding to the first operation.

In other words, in the embodiment, after the display picture on the terminal apparatus is sent to the wearable device for display, the touch sensor in the terminal apparatus still runs and can detect an operation performed by the user operation body. Thus, in the embodiment, the touch instruction corresponding to the first operation is executed on the terminal apparatus after the first operation performed by the user operation body is received through the touch sensor.

Figure 8:
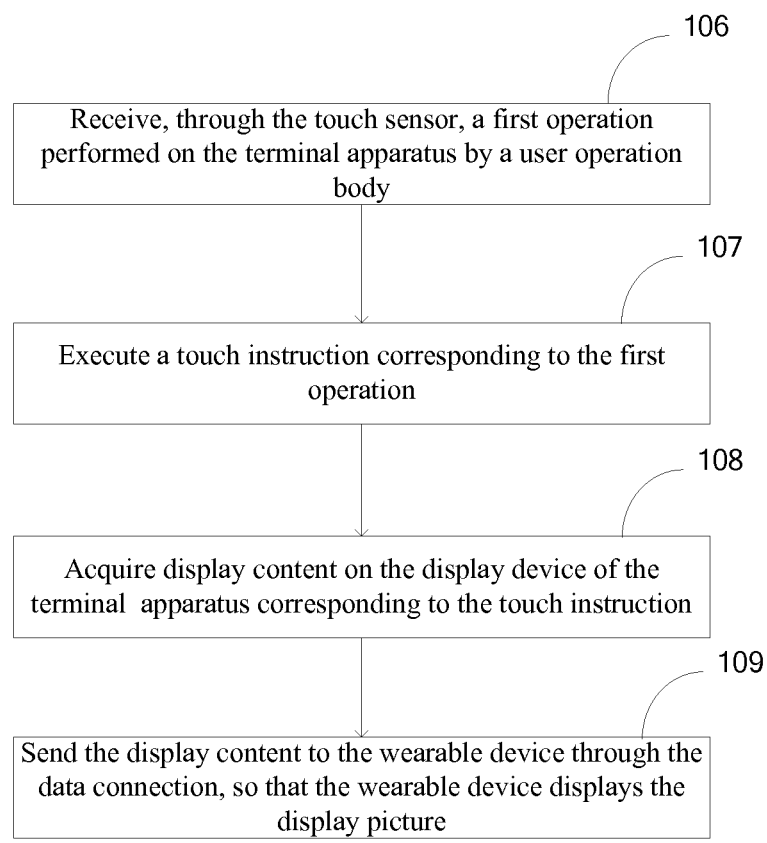
FIG. 8 is another partial flowchart according to the fifth embodiment.

Based on the implementation, referring to FIG. 8, another partial flowchart according to the fifth embodiment of the disclosure is shown. After the step 107, the method may further include steps 108-109.

Step 108 may include acquiring display content on the display device of the terminal apparatus corresponding to the touch instruction.

Step 109 may include sending the display content to the wearable device through the data connection, so that the wearable device displays the display content.

In other words, in the embodiment, after the touch instruction is executed, the display content on the display device of the terminal apparatus corresponding to the touch instruction is sent to the wearable device, to dynamically update the display content on the wearable device based on real time display content on the display device of the terminal apparatus.

Figure 9:
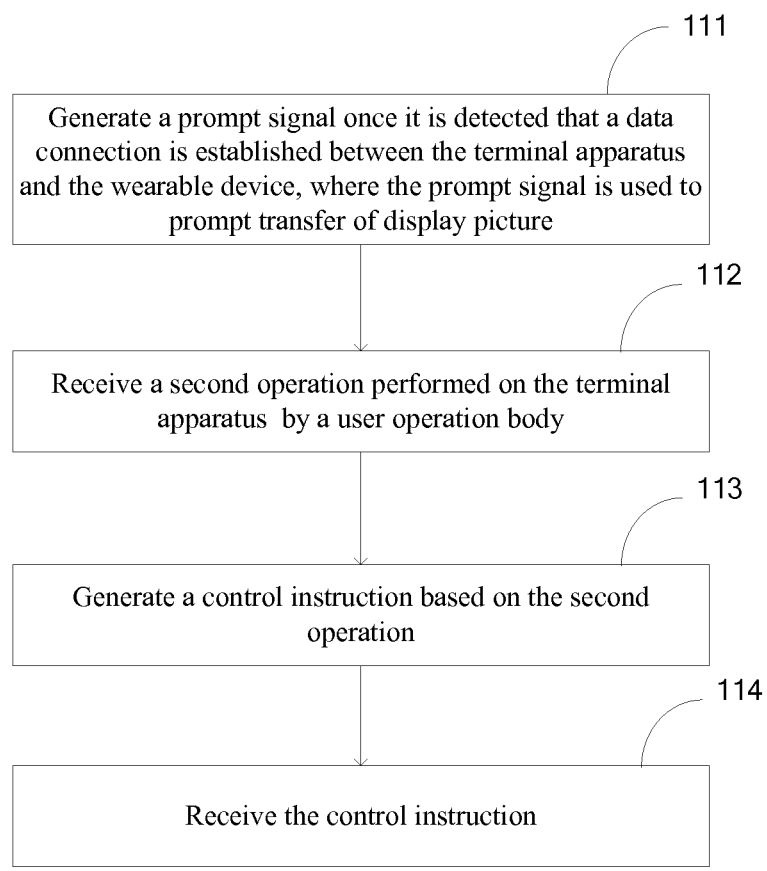
FIG. 9 is a partial flowchart of a control method according to a sixth embodiment of the disclosure.

Referring to FIG. 9, a flowchart of the step 101 in a control method according to a sixth embodiment of the disclosure is shown. The step 101 may include steps 111-114.

Step 111 may include generating a prompt signal, where the prompt signal prompts transfer of display picture once it is detected that a data connection is established between the terminal apparatus and the wearable device.

In other words, in the embodiment, the connection between the terminal apparatus and the wearable device is detected in real time. Once the data connection is detected, the prompt signal may be generated, which may be a group of display characters or an audio file such as characters "view with glasses" or a voice signal "you may choose to view with glasses", in order to prompt allowable transfer of display picture. After receiving the prompt signal, a user may perform an operation on the terminal apparatus based on requirements, to indicate whether the user needs to perform the transfer of display picture.

Step 112 may include receiving a second operation performed on the terminal apparatus by a user operation body.

In other words, in the embodiment, the second operation is received after the user performs the second operation on the terminal apparatus based on the prompt signal.

Step 113 may include generating a control instruction based on the second operation.

The second operation may be an operation such as a click indicating that the user needs to perform the transfer of display picture, in order to change the viewing experience.

Step 114 may include receiving the control instruction.

Thus, in the embodiment, after being acquired based on the control instruction, the display picture on the display device of the terminal apparatus is sent to the wearable device for display, and the transfer of display picture is achieved. More viewing modes are introduced and the viewing experience is improved for the user.

Figure 10:
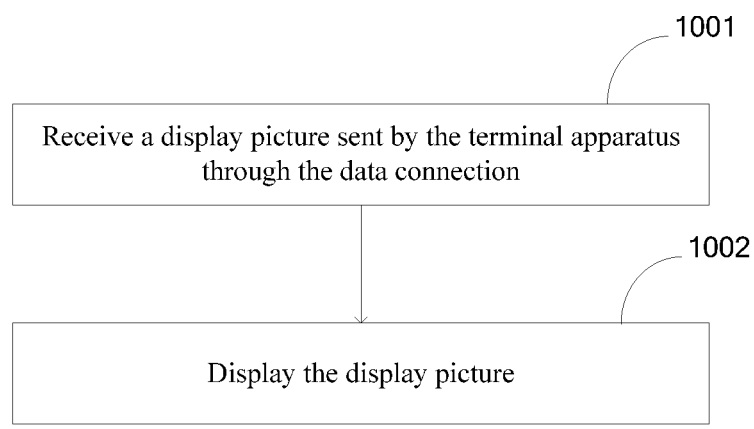
FIG. 10 is a flowchart of a control method according to a seventh embodiment of the disclosure.

Referring to FIG. 10, a flowchart of a control method according to a seventh embodiment of the disclosure is shown. The method may be applied to a wearable device, where the wearable device can establish a data connection with a terminal apparatus with a display device, the terminal apparatus may be a device with a display screen such as a cell phone, a pad, an all-in-one machine and a laptop computer, and the wearable device may be a wearable device such as a pair of smart glasses or a smart watch. The data connection between the terminal apparatus and the wearable device may be established via a wireless communication module such as a WiFi or Bluetooth wireless communication module, as shown in FIG. 2.

In the embodiment, the method may include steps 1001-1002.

Step 1001 may include receiving a display picture sent by the terminal apparatus through the data connection.

The display picture is a display picture acquired from the display device by the terminal apparatus based on a control instruction generated by the terminal apparatus.

The control instruction is an instruction generated on the terminal apparatus when a user needs to change current viewing experience, and the terminal apparatus acquires the display picture on the display device based on the control instruction and afterwards sends the display picture to the wearable device through the data connection.

The display picture may be a picture in a partial or whole content display area on the display device.

Step 1002 may include displaying the display picture.

Specifically, in the embodiment, the received display picture is displayed on the display device of the wearable device. For example, the display picture is displayed on a display screen of a dial of a smart watch, and the display picture may be also displayed on a specific display screen of the wearable device such as a tiny head-mounted display screen equipped on lenses of smart glasses. In the embodiment, the wearable device projects the display picture on a small screen of a lens display over the user glasses, and the display effect is the same as a 25-inch high-resolution screen 2.4 meters away.

As can be seen from the solution mentioned above, in the control method according to the seventh embodiment of the disclosure, after being received, the display picture acquired by the terminal apparatus based on the control instruction generated by the terminal apparatus is displayed, to display the display picture on another device different from the terminal apparatus and enhance viewing experience of viewing the display picture for the user.

Figure 11:
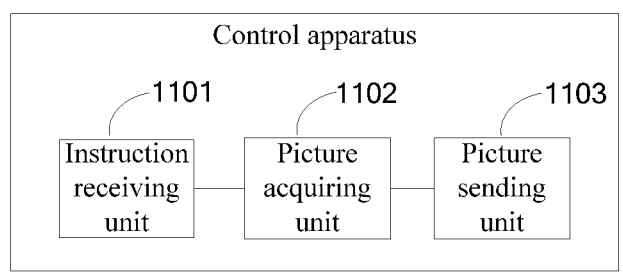
FIG. 11 is a structural diagram of a control apparatus according to an eighth embodiment of the disclosure.

Referring to FIG. 11, a structural diagram of a control apparatus according to an eighth embodiment of the disclosure is shown. The embodiment may be applied to a terminal apparatus with a display device, such as a device with a display screen, like a cell phone, a pad, an all-in-one machine and a laptop computer. The wearable device may be a wearable device such as a pair of smart glasses or a smart watch. The data connection between the terminal apparatus and the wearable device may be established via a wireless communication module such as a WiFi or Bluetooth wireless communication module In the embodiment, the apparatus may include an instruction receiving unit 1101, a picture acquiring unit 1102 and a picture sending unit 1103.

The instruction receiving unit 1101 is configured to receive a control instruction generated by the terminal apparatus.

The control instruction is an instruction generated on the terminal apparatus when a user needs to change current viewing experience. In the embodiment, the instruction receiving unit 1101 receives and responds to the control instruction.

The picture acquiring unit 1102 is configured to acquire a display picture on the display device of the terminal apparatus based on the control instruction.

The display picture may be a picture in a partial whole content display area on the display device.

In the embodiment, the picture acquiring unit 1102 responds to the received control instruction, that is, a display picture of a part of or the entire content display area on the display device of the terminal apparatus is acquired. i.e., the picture acquiring unit 1102 acquires the display picture in the partial or whole content display area on the display device.

The picture sending unit 1103 is configured to send the display picture to the wearable device through the data connection, so that the wearable device displays the display content.

As shown in FIG. 2, the data connection is established between a terminal apparatus A and a wearable device such as a watch B. In the embodiment, after the picture acquiring unit 1102 acquires the display picture on the terminal apparatus, the picture sending unit 1103 sends the display picture to the wearable device through the data connection, so that the wearable device displays the display content, which enhances viewing experience of viewing the display picture for a user.

The wearable device displays the received display picture on its display device. For example, the display picture is displayed on a display screen of a dial of the smart watch, and the display picture may be also displayed on a specific display screen of the wearable device such as a tiny head-mounted display screen equipped on lenses of smart glasses. In the embodiment, the wearable device projects the display picture on a small screen of a lens display over the user glasses, and the display effect is the same as a 25-inch high-resolution screen 2.4 meters away.

As can be seen from the technical solution mentioned above, for the control apparatus according to the eighth embodiment of the disclosure, after the terminal apparatus generates the control instruction, the display picture on the display device of the terminal apparatus is sent to the wearable device through the data connection, to display the display picture on the wearable device. Thus, viewing experience different from viewing through the terminal apparatus is provided for the user and the viewing experience for the user is improved.

Figure 12:
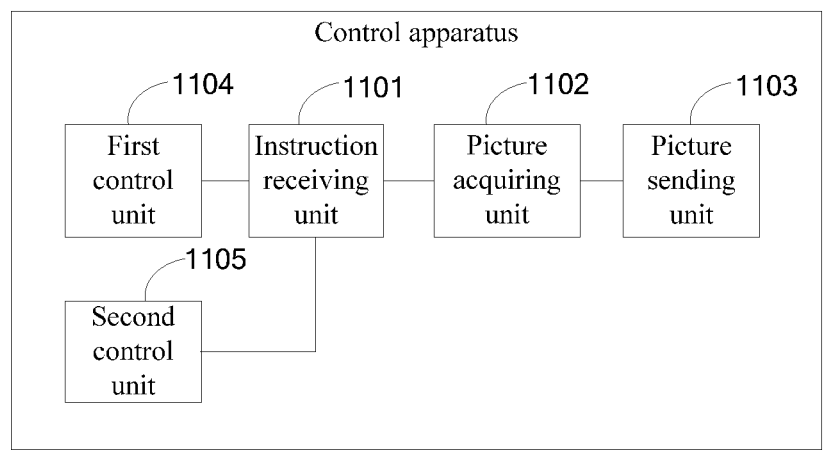
FIG. 12 is a structural diagram of a control apparatus according to a ninth embodiment of the disclosure.

Based on the foregoing solution, in order to improve security of content displayed on the terminal apparatus, for example, the display content on the display device visible to other people when a user uses the terminal apparatus in a public place such as a bus or a subway, a structural diagram of a control apparatus according to a ninth embodiment of the disclosure is shown in FIG. 12. The apparatus may further include a first control unit 1104 and a second control unit 1105.

The first control unit 1104 is configured to control the terminal apparatus not to display the display picture on the display device based on the control instruction after the instruction receiving unit 1101 receives the control instruction.

In other words, in the embodiment, after the instruction receiving unit 1101 receives the control instruction, the first control unit 1104 controls the terminal apparatus not to display the display picture based on the control instruction when the picture acquiring unit 1102 sends the display picture acquired from the terminal apparatus to the wearable device for display based on the control instruction, for example, the screen of the terminal apparatus is blacked out or the display device of the terminal apparatus is turned off, so that other people cannot see or cannot see clearly the display content on the display device when the user uses the terminal apparatus, thus the security of the display content on the display device of the terminal apparatus is improved.

The second control unit 1105 is configured to control display brightness of the display device of the terminal apparatus to reduce to a preset threshold based on the control instruction after the instruction receiving unit 1101 receives the control instruction.

The threshold may be a value preset by the user based on requirements such as a scenario the user is in. In other words, in the embodiment, after the instruction receiving unit 1101 receives the control instruction, the second control unit 1105 controls the brightness of the display device of the terminal apparatus to reduce to the preset threshold based on the control instruction when the picture acquiring unit 1102 sends the display picture acquired from the terminal apparatus to the wearable device for display based on the control instruction, for example, the brightness of the display device is reduced to 35% or 0%, so that other people cannot see or cannot see clearly the display content on the display device when the user uses the terminal apparatus, thus the security of the display content on the display device of the terminal apparatus is improved.

In practical implementations, among the first control unit 1104 and the second control unit 1105 in the embodiment, only one control unit is in a running state while the other control unit is in an idling state at the same time. In other words, in the embodiment, either the first control unit 1104 is triggered to control the terminal apparatus not to display the display picture on the display device or the second control unit 1105 is triggered to control the display brightness of the display device of the terminal apparatus to reduce to the preset threshold at the same time, rather than both control units are triggered simultaneously.

Figure 13:
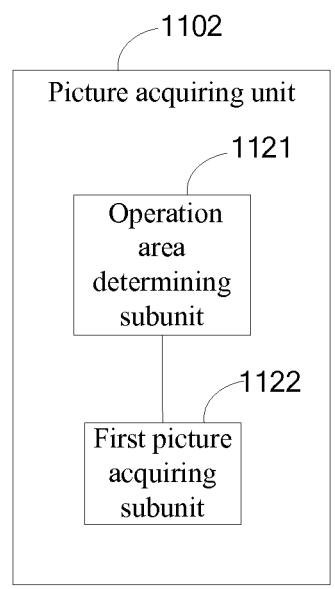
FIG. 13 is a partial structural diagram of a control apparatus according to a tenth embodiment of the disclosure.

Referring to FIG. 13, a structural diagram of the picture acquiring unit 1102 in a control apparatus according to a tenth embodiment of the disclosure is shown. The picture acquiring unit 1102 may include an operation area determining subunit 1121 and a first picture acquiring subunit 1122.

The operation area determining subunit 1121 is configured to determine based on the control instruction an operation area of a user on the terminal apparatus.

The operation area may be a partial or whole display area on the display device of the terminal apparatus.

The first picture acquiring subunit 1122 is configured to acquire a display picture on the display device of the terminal apparatus corresponding to the operation area.

The operation area may be an operation area corresponding to an operation the user performs on the terminal apparatus after the terminal apparatus generates the control instruction. In the embodiment, the operation area is determined after the terminal apparatus generates the control instruction, to acquire a display picture corresponding to the operation area, which may be a picture in a partial or whole display area on the display device. Or, the operation area may be an operation area corresponding to an operation the user performs on the terminal apparatus when or after the terminal apparatus generates the control instruction. In the embodiment, the operation area is determined and afterwards the display picture corresponding to the operation area is acquired, which may be a picture in a partial or whole display area on the display device.

Figure 14:
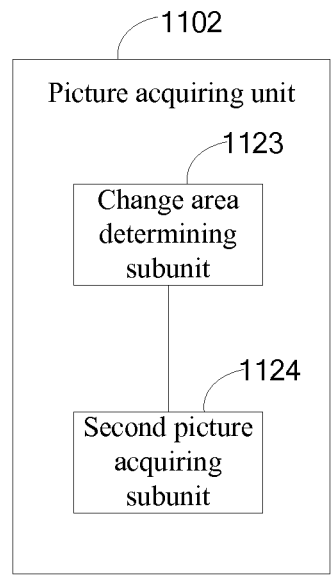
FIG. 14 is a partial structural diagram of a control apparatus according to an eleventh embodiment of the disclosure.

In another specific implementation, referring to FIG. 14, a structural diagram of the picture acquiring unit 1102 in a control apparatus according to an eleventh embodiment of the disclosure is shown. The picture acquiring unit 1102 may include a change area determining subunit 1123 and a second picture acquiring subunit 1124.

The change area determining subunit 1123 is configured to determine based on the control instruction a display area where display content on the display device of the terminal apparatus changes.

The second picture acquiring subunit 1124 is configured to acquire a display picture in the display area.

In other words, in the embodiment, after the control instruction is received, the control instruction is responded to, i.e., a display picture corresponding to a display area where the display content on the display device of the terminal apparatus changes is acquired. In subsequent operations, the display picture of which the display content changes is sent to the wearable device through the data connection, i.e., only the display picture corresponding to the display area where the display content on the display device of the terminal apparatus changes is displayed on the wearable device, to reduce data transmission amount, speed up picture updating efficiency and improve viewing experience for a user.

Figure 15:
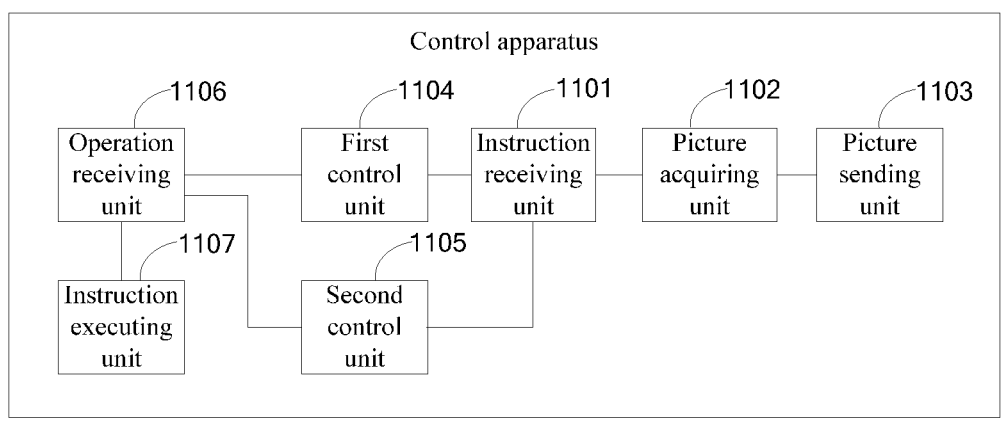
FIG. 15 is a structural diagram of a control apparatus according to a twelfth embodiment of the disclosure.

In practical implementations, the terminal apparatus such as a cell phone usually includes a touch sensor, which can detect a touch operation performed on the terminal apparatus by a user operation body. Referring to FIG. 15, a structural diagram of a control apparatus according to a twelfth embodiment of the disclosure is shown. The apparatus may further include an operation receiving unit 1106 and an instruction executing unit 1107.

The operation receiving unit 1106 is configured to receive, through the touch sensor, a first operation performed on the terminal apparatus by a user operation body, after the first control unit 1104 controls the terminal apparatus not to display the display picture on the display device, or after the second control unit 1105 controls display brightness of the display device of the terminal apparatus to reduce to a preset threshold.

The instruction executing unit 1107 is configured to execute a touch instruction corresponding to the first operation.

In other words, in the embodiment, after the display picture on the terminal apparatus is sent to the wearable device for display, the touch sensor in the terminal apparatus still runs and can detect an operation performed by the user operation body. Thus, in the embodiment, the touch instruction corresponding to the first operation is executed on the terminal apparatus after the first operation performed by the user operation body is received through the touch sensor.

Figure 16:
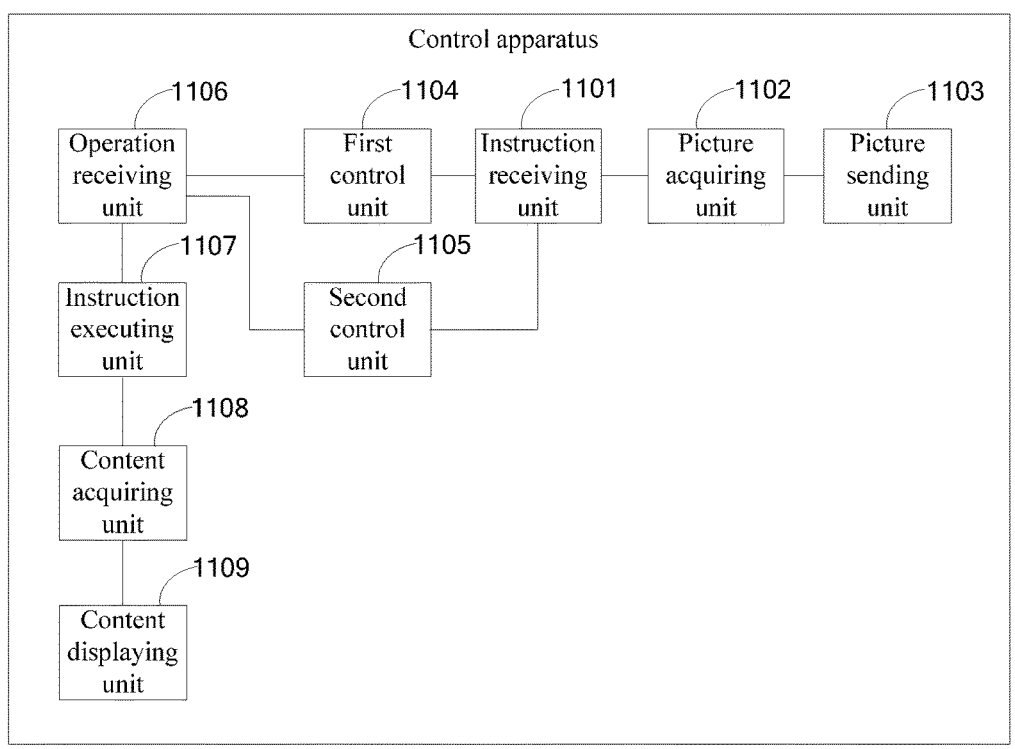
FIG. 16 is another structural diagram according to the twelfth embodiment of the disclosure.

Based on this implementation, referring to FIG. 16, another structural diagram according to the twelfth embodiment of the disclosure is shown. The apparatus may further include a content acquiring unit 1108 and a content displaying unit 1109.

The content acquiring unit 1108 is configured to acquire display content on the display device of the terminal apparatus corresponding to the touch instruction, after the instruction executing unit 1107 executes the touch instruction.

The content displaying unit 1109 is configured to send the display content to the wearable device through the data connection, so that the wearable device displays the display content.

In other words, in the embodiment, after the touch instruction is executed, the display content on the display device of the terminal apparatus corresponding to the touch instruction is sent to the wearable device, to dynamically update the display content on the wearable device based on real time display content on the display device of the terminal apparatus.

Figure 17:
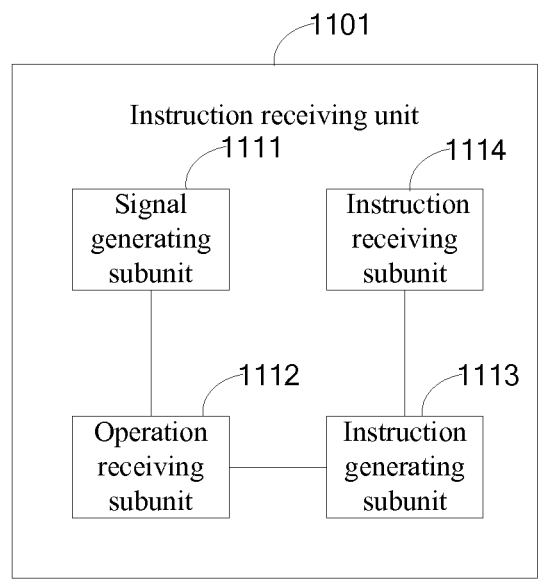
FIG. 17 is a part of a structural diagram of a control apparatus according to a thirteenth embodiment of the disclosure.

Referring to FIG. 17, a structural diagram of the instruction receiving unit 1101 in a control apparatus according to a thirteenth embodiment of the disclosure is shown. The instruction receiving unit 1101 may include a signal generating subunit 1111, an operation receiving subunit 1112, an instruction generating subunit 1113 and an instruction receiving subunit 1114.

The signal generating unit 1111 is configured to generate a prompt signal, where the prompt signal is used to prompt transfer of display picture once it is detected that a data connection is established between the terminal apparatus and the wearable device.

In other words, in the embodiment, the connection between the terminal apparatus and the wearable device is detected in real time. Once the data connection is detected, the prompt signal may be generated, which may be a group of display characters or an audio file such as characters "view with glasses" or a voice signal "you may choose to view with glasses", in order to prompt allowable transfer of display picture. After receiving the prompt signal, a user may perform an operation on the terminal apparatus based on requirements, to indicate whether the user needs to perform the transfer of display picture.

The operation receiving subunit 1112 is configured to receive a second operation performed on the terminal apparatus by a user operation body.

In other words, in the embodiment, the second operation is received after the user performs the second operation on the terminal apparatus based on the prompt signal.

The instruction generating subunit 1113 is configured to generate a control instruction based on the second operation.

The second operation may be an operation such as a click indicating that the user needs to perform the transfer of display picture, in order to change the viewing experience.

The instruction receiving subunit 1114 is configured to receive the control instruction.

In the embodiment, after the display picture on the display device of the terminal apparatus is acquired based on the control instruction, the display picture is sent to the wearable device for display, and the transfer of display picture is achieved. More viewing modes are introduced and the viewing experience is improved for the user.

Figure 18:
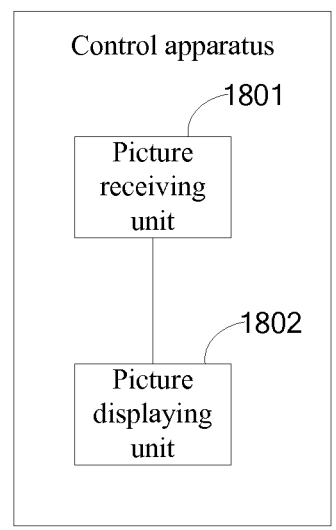
FIG. 18 is a structural diagram of a control apparatus according to a fourteenth embodiment of the disclosure.

Referring to FIG. 18, a structural diagram of a control apparatus according to a fourteenth embodiment of the disclosure is shown. The apparatus may be applied to a wearable device, where the wearable device can establish a data connection to a terminal apparatus with a display device, the terminal apparatus may be a device with a display screen such as a cell phone, a pad, an all-in-one machine and a laptop computer, and the wearable device may be a wearable device such as a pair of smart glasses or a smart watch. The data connection between the terminal apparatus and the wearable device may be established via a wireless communication module such as a WiFi or Bluetooth wireless communication module, as shown in FIG. 2.

In the embodiment, the apparatus may include a picture receiving unit 1801 and a picture displaying unit 1802.

The picture receiving unit 1801 is configured to receive a display picture sent by the terminal apparatus through the data connection.

The display picture is a display picture acquired from the display device by the terminal apparatus based on a control instruction generated by the terminal apparatus.

The control instruction is an instruction generated on the terminal apparatus when a user needs to change current viewing experience. The terminal apparatus acquires the display picture from the display device based on the control instruction, and afterwards sends the display picture to the wearable device through the data connection.

The display picture may be a picture in a partial or whole content display area on the display device.

The picture displaying unit 1802 is configured to display the display picture.

In the embodiment, the received display picture may be displayed on a display device of the wearable device. For example, the display picture is displayed on a display screen of a dial of a smart watch, and the display picture may be also displayed on a specific display screen of the wearable device such as a tiny head-mounted display screen equipped on lenses of smart glasses. In the embodiment, the wearable device projects the display picture on a small screen of a lens display over the user glasses, and the display effect is the same as a 25-inch high-resolution screen 2.4 meters away.

As can be seen from the solution mentioned above, for the control apparatus according to the fourteenth embodiment of the disclosure, after being received, the display picture acquired by the terminal apparatus based on the control instruction generated by the terminal apparatus is displayed, to display the display picture on another device different from the terminal apparatus and enhance viewing experience of viewing the display picture for the user.

The foregoing method embodiments are described as a series of action combinations for simplicity. Those skilled in the art should know that the disclosure is not limited to the described sequences of the actions, for some steps may be performed in other sequences or simultaneously according to the disclosure. In addition, those skilled in the art should also know that the embodiments described in the disclosure are all preferred embodiments, and the actions and modules involved are not necessarily required for the disclosure.

Embodiments in the disclosure are described in a progressive manner, differences between each embodiment and the other embodiments are emphasized and similar parts in the embodiments can be cross-referenced. The apparatus embodiments are described briefly for they corresponds to the method embodiments, and reference can be made to the descriptions of the method embodiments for related aspects.

It should be noted that relational terms such as the first or the second are only used to differentiate one entity or operation from another entity or operation rather than require or indicate actual relations or sequences among the entities or operations. And, terms such as "include", "comprise" or any other variants are meant to cover non-exclusive enclosure, so that a process, method, item or device comprising a series of elements comprise not only those elements but also other elements which are not listed specifically or the inherent elements of the process, method, item and device. Without more limitations, the element restricted by the phrase "include a . . . " does not exclude the existence of other same elements in the process, method, item or device including the elements.

For convenience, the apparatus is described in terms of function units. Of course, functions of the various units may be realized in one or more software and/or hardware.

According to the above description of the implementations, those skilled in the art can clearly understand that the disclosure can be implemented through software plus a necessary universal hardware platform. Based on such understanding, the essence or the parts contributing to conventional technology of the technical solution of the disclosure can be embodied d in a form of a software product. The computer software product may be stored in a storage medium such as a ROM/RAM, a disk or an optical disc, and include some instructions for a computer device (may be a personal computer, a server or a network device) to execute the method described in each embodiment of the disclosure or in some parts of each embodiment.

The above description of the embodiments of the disclosure allows those skilled in the art to realize or use the disclosure. Various modifications to the embodiments are obvious to those skilled in the art, and general principles defined in the disclosure can be realized in other embodiments without departing from essential or scope of the disclosure. Thus, the disclosure is not limited to the described embodiments, but conforms to a widest scope consistent with the principles and novel features in the disclosure.

What is claimed is:

1. A control method, applied to a terminal apparatus with a display device, wherein the terminal apparatus is able to establish a data connection with a wearable device, and the method comprises:
   receiving a control instruction generated by the terminal apparatus;
   wherein the receiving the control instruction generated by the terminal apparatus comprises:
      detecting the data connection between the terminal apparatus and the wearable device in real time;
      generating a prompt signal immediately after detection of the data connection being established between the terminal apparatus and the wearable device, wherein the prompt signal is used to prompt a user to transfer a displaying of a display picture from the display device of the terminal apparatus to the wearable device;

receiving a second operation performed on the terminal apparatus by a user operation body;

generating the control instruction based on the second operation; wherein the control instruction is an instruction for changing a current viewing display device; and receiving the control instruction;

acquiring the display picture from the display device of the terminal apparatus based on the control instruction;

wherein acquiring the display picture on the display device of the terminal apparatus based on the control instruction comprises:

determining an operation area of the user on the terminal apparatus; wherein the operation area is determined corresponding to an operation the user performs on the terminal apparatus after the terminal apparatus generates the control instruction; and acquiring the display picture on the display device of the terminal apparatus corresponding to the operation area;

sending the display picture to the wearable device through the data connection so that the wearable device displays the display picture;

determining, based on the control instruction, a display changing area in which display content displayed on the display device changes;

acquiring display data corresponding to the display changing area;

sending only the display data corresponding to the display changing area to the wearable device through the data connection so that the wearable device updates the display picture based on the display data corresponding to the display changing area; and performing at least one of:

(i) controlling the terminal apparatus not to display the display picture on the display device based on the control instruction; or (ii) controlling display brightness of the display device of the terminal apparatus to reduce to a preset threshold based on the control instruction.

2. The method according to claim 1, wherein acquiring the display picture on the display device of the terminal apparatus based on the control instruction comprises:

determining, based on the control instruction, an operation area of a user on the terminal apparatus; and acquiring the display picture on the display device of the terminal apparatus corresponding to the operation area.

3. The method according to claim 1, wherein the terminal apparatus comprises a touch sensor, and after at least one of (i) controlling the terminal apparatus not to display the display picture on the display device based on the control instruction or (ii) after controlling the display brightness of the display device of the terminal apparatus to reduce to the preset threshold based on the control instruction, the method further comprises:

receiving, through the touch sensor, another operation performed on the terminal apparatus by the user operation body, and executing a touch instruction corresponding to the another operation.

4. The method according to claim 3, wherein after executing the touch instruction corresponding to the another operation, the method further comprises:

acquiring display content on the display device of the terminal apparatus corresponding to the touch instruction; and sending the display content to the wearable device through the data connection so that the wearable device displays the display content.

5. A control apparatus, applied to a terminal apparatus with a display device, wherein the terminal apparatus is able to establish a data connection with a wearable device, and the control apparatus comprises a storage medium in which instructions are stored, wherein, the instructions, when being executed by the control apparatus, cause the control apparatus to:

receive a control instruction generated by the terminal apparatus;

wherein receiving the control instruction generated by the terminal apparatus comprises:

detecting the data connection between the terminal apparatus and the wearable device in real time;

generating a prompt signal immediately after detection of the data connection being established between the terminal apparatus and the wearable device, wherein the prompt signal is used to prompt a user to transfer a displaying of a display picture from the display device of the terminal apparatus to the wearable device;

receiving a second operation performed on the terminal apparatus by a user operation body;

generating the control instruction based on the second operation; wherein the control instruction is an instruction for changing a current viewing display device; and receiving the control instruction;

acquire the display picture from the display device of the terminal apparatus based on the control instruction;

wherein acquiring the display picture on the display device of the terminal apparatus based on the control instruction comprises:

determining an operation area of the user on the terminal apparatus;

wherein the operation area is determined corresponding to an operation the user performs on the terminal apparatus after the terminal apparatus generates the control instruction; and acquiring the display picture on the display device of the terminal apparatus corresponding to the operation area;

send the display picture to the wearable device through the data connection so that the wearable device displays the display picture;

determine, based on the control instruction, a display changing area in which display content displayed on the display device changes;

acquire display data corresponding to the display changing area;

send only the display data corresponding to the display changing area to the wearable device through the data connection so that the wearable device updates the display picture based on the display data corresponding to the display changing area; and perform at least one of:

(i) controlling the terminal apparatus not to display the display picture on the display device based on the control instruction; or (ii) controlling display brightness of the display device of the terminal apparatus to reduce to a preset threshold based on the control instruction.

6. The apparatus according to claim 5, wherein the terminal apparatus comprises a touch sensor, and accordingly, the instructions, when being executed by the control apparatus, cause the control apparatus to:

receive, through the touch sensor of the terminal apparatus, a first operation performed on the terminal apparatus by a user operation body, after at least one of (i) controlling the terminal apparatus not to display the display picture on the display device or (ii) controlling the display brightness of the display device of the terminal apparatus to reduce to the preset threshold; and execute a touch instruction corresponding to the first operation.

7. The apparatus according to claim 6, wherein, the instructions, when being executed by the control apparatus, further cause the control apparatus to:

display content on the display device of the terminal apparatus corresponding to the touch instruction after executing the touch instruction; and send the display content to the wearable device through the data connection so that the wearable device displays the display content.

* * * * *